United States Patent Office 3,173,449
Patented Mar. 16, 1965

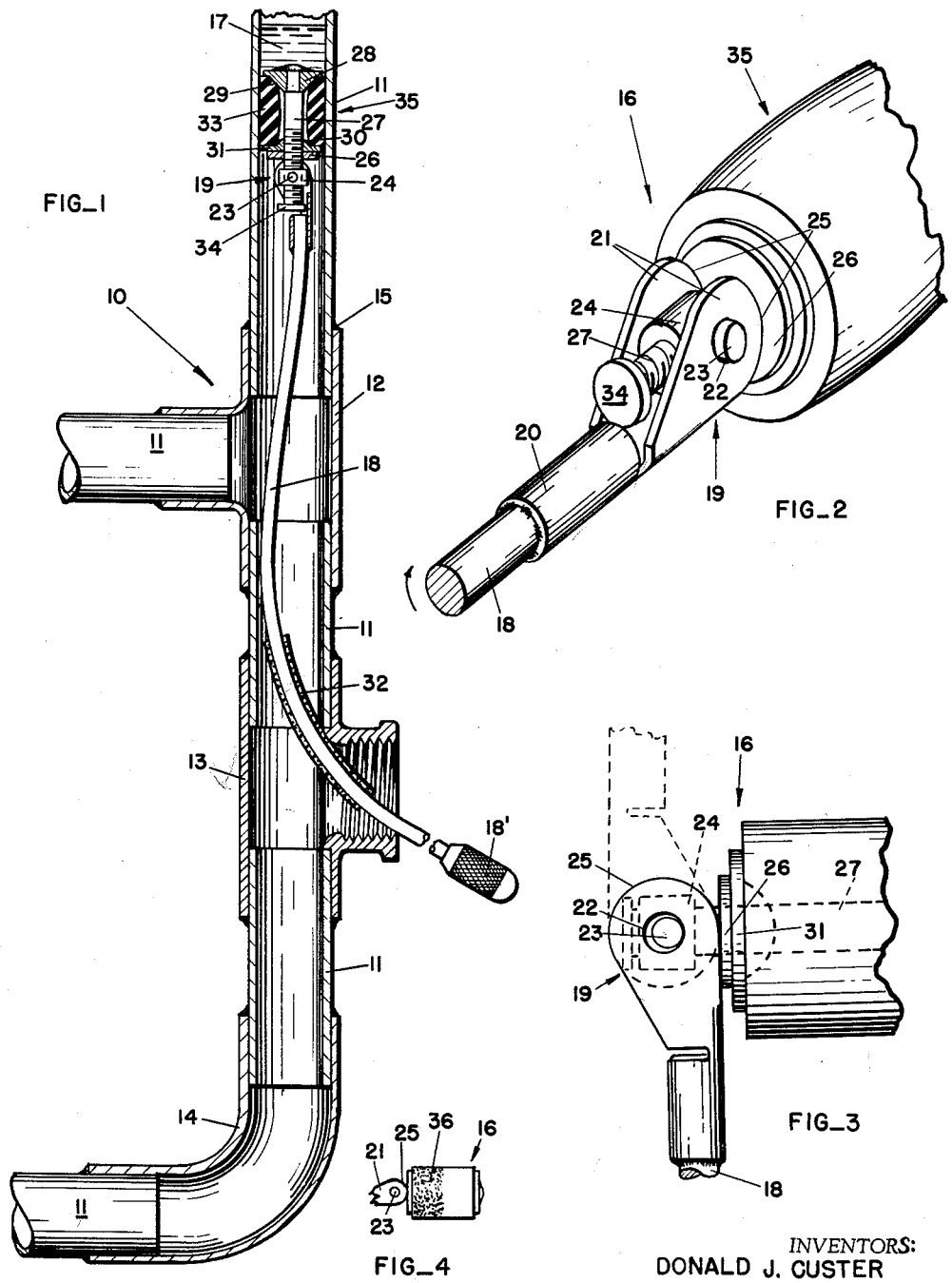
FIG_1
FIG_2
FIG_3
FIG_4
INVENTORS:
DONALD J. CUSTER
ADRIAN L. LONG
BY *Norman H. Bugg*

3,173,449
SHAFT EXTENSION PLUG FOR PIPES
Donald J. Custer, 1324 W. Dalton, Spokane, Wash., and
Adrian L. Long, Spokane, Wash.; said Long assignor to
said Custer
Filed May 9, 1963, Ser. No. 279,085
2 Claims. (Cl. 138—93)

The present invention lies in the broad field of tools and more particularly is an expandable plug.

Piping in residences and commercial structures is now more frequently being fabricated from copper tubing, which has its fittings and couplings jointed by conventional and now well known processes of sweat-soldering. It is now clear, that due to variable conditions, for example, the chemical constituents of the water or electrolysis and temperature changes which effect internal stresses due to the differences in the coefficients of expansion of the soldering compound and the copper pipe, leakage at the joints is common.

In good plumbing practice, a system is designed with a shut-off valve at a strategic point, to permit shutting off the water supply to the system for subsequent servicing of the piping. However, after a period of time, many shut-off valves will not close tightly and there will be leakage or seepage of the fluid by the valve into the portion of the system which requires servicing. Liquids which remain in piping systems out of service for repairs or additions, usually come from the following sources: (1) residual liquids which lie in flat piping or piping with very little grade; (2) drain-back from piping at a higher elevation in the system; and (3) leakage from defective shut-off valves.

Assuming, for illustration but not limitation, that the fluid being conducted is water, and one is endeavoring to solder a joint, if water is present at the point being soldered, it is impossible to make an acceptable joint until the water has been effectively disposed of.

The present invention has for its primary object, the provision of an expandable plug which may be inserted into the piping system to prevent liquids from flowing into the particular part of the piping being altered or repaired.

Another object of the present invention lies in the provision of a seepage plug which is carried on the end of an elongated flexible member which enables the operator to insert the plug to a position removed from the area to which heat will be applied during the soldering process.

It is yet another object of the present invention to provide the aforesaid plug with means for expanding and contracting the plug within the pipe by alternate manual rotation of the flexible torque member supporting the plug a one end.

It is still another object of the present invention to provide an expandable plug which may be introduced into a piping system through a T fitting.

A further object of this invention is that by a unique pivotally jointed connection of the flexible member with the plug, an operator is able to insert and extract the plug through a fitting with a right-angle opening.

Further objects and advantages of the present invention are to provide an expandable plug which is simple of construction, inexpensive to manufacture and not liable to excessive wear and therefore one which will effectively function over a long period of time.

The foregoing objects and other objects and advantages of the present invention will become apparent during the course of the following specification when considered in conjunction with the accompanying drawings wherein a preferred form of the present invention is disclosed.

In the said drawings, like numerals are employed to designate like parts through the several views and;

FIGURE 1 shows an axial cross section of a portion of a plumbing system having an expandable plug, embodying the present invention, associated therewith and having parts broken away for convenience of illustration;

FIGURE 2 is an enlarged fragmentary perspective view of the hinged connection between the torque member and the plug;

FIGURE 3 is a side elevation of the elements seen in FIGURE 2 and showing the angularity of the torque member between full and broken line positions; and FIGURE 4 is a fragmentary elevation of a plug further modified and upon a reduced scale.

In FIGURE 1, the numeral 10 indicates a conventional plumbing system which utilizes so-called copper pipe 11 and a number of fittings, as for example, T fittings 12, plugged T 13 and elbow 14. In the interest of clarity, consider that the pipe 11, between the T 12 and the elbow 14, is a continuous length not having the plugged T 13 therein and the water in the system begins to leak through a faulty connection between the T 12 and the pipe 11, as for example at 15. The plumber shutting off the water supply, cuts the pipe 11 between the T 12 and elbow 14 removing sufficient to enable him to install the plugged T 13. With the service to the building "turned off" by means of a cut-off valve (not shown) in the closed position, water may be seeping through the valve and leaking through the system. He then inserts the plug 35 (indicated in its entirety by the numeral 16) into a position as shown in FIGURE 1, expands the plug by rotating the flexible torque member 18, and thus stops the seepage water 17. He may then solder the faulty connection 15 and also solder the connections of the plug T 13 to the pipe ends 11. The seepage plug 16 is then removed and a plug (not shown) threadedly engaged in the plug T 13 to close the circuit, whereupon the service valve or cut-off valve may be opened to fill the system with water.

The seepage plug which constitutes the essence of the present invention comprises an elongated flexible torque member 18 which, for example, may be a flexible cable or chain, and has a hand knob 18' at one end thus providing manual means for rotation of the torque member 18.

At its opposed end the torque member 18 is soldered to hinging means 19. The hinging means includes a sleeve 20 in which the end of the torque member 18 is soldered and the sleeve 20 carries a pair of spaced ears 21 which have aligned apertures 22 therein. The apertures 22 receive diametrically disposed bosses 23 formed on an advancing nut 24. As here shown, the ears 21 have arcuate edges 25 which impinge against a wear plate or thrust bearing 26. The thrust bearing or plate 26 encircles a shaft 27. The nut 24 is threadedly engaged on the shaft 27 so that relative rotation of the nut 24 with respect to the shaft 27 will cause advancement of the nut axially thereof in a direction dictated by the pitch of the threads.

At the end opposed to the nut 24 shaft 27 is provided with an enlarged impervious head 28 which has a conical inwardly directed expanding face 29 and a nut confinement 34 at the other. This face 29 cooperates with the inwardly directed expanding face 30 of a compression head 31 encircling the shaft 27 intermediate the head 28 and the thrust plate 26. The expanding face on the compression head 31 is shown spherical shaped, however any configuration suitable for facilitating expansion of the sleeve 33 will suffice.

Encircling the torque member 18 is a sleeve 32 which is slidable from end to end of the torque member 18 and is made from a heat insulating material. The insulating sleeve 32 is provided to protect the torque member 18 from the heat which may be imparted thereto while soldering a joint in proximity thereto.

Assuming the threads of the shaft and nut are conventional right hand threads, counterclockwise rotation of the torque member 18 will cause the nut 24 to back off or separate the heads 28 and 31 thus enabling the deformable resilient sleeve 33, of the expandable pipe plug 35, to contract to its minimal circumference so that it may be withdrawn or placed into a pipe 11. It will be understood that the minimal circumference of the plug 35 is such as to slidingly fit the internal diameter of the pipe being worked upon to permit axial movement therein by pressures axially of the torque member 18. After the plug 35 is placed in the tube clockwise rotation of the torque member 18 will rotate the nut 24 about the shaft 27 which is held against rotation by pushing against the face of the plug with a light metal rod while tightening the torque member. This rotation causes the heads 28–31 to advance toward each other compressing the sleeve 33 and causing it to expand thus forming a plug or dam to the seepage 17. Obviously, the greater the applied torque, the greater the expansion pressures, thus enabling one to also hold conventional water pressures inside the pipes when this becomes necessary. In FIGURE 4 we have shown the sleeve 33 circumferentially covered by a gripping abrasive 36 on the down stream end. Fluid pressure on the upstream head 28 further assists in expanding the plug sleeve 33 to result in an expanding pressure increase directly proportional to the fluid pressure being held.

Having thus described our invention, we desire to secure by Letters Patent of the United States the following:

1. A plug of the character described, comprising:

an elongated flexible torque member having means for manual rotation at one end;

an impervious expandable pipe plug at the other end of said torque member;

hinge means interconnecting said torque member and plug for effecting axial angularity therebetween; and means responsive to rotation of said torque member in alternate directions for alternately expending and contracting said plug.

2. A plug of the character described, comprising:

a shaft having a head at one end and threaded for a portion of its length from the opposed end;

a compression head slidably associated with said shaft;

a deformable sleeve encircling said shaft intermediate of said heads and expandable when subject to axial compression between said heads;

an advancing nut threadedly associated with the threads of said shaft for effecting axial movements of said heads toward and away from each other from relative opposite rotation of said nut and said shaft;

an elongated flexible torque member having means for rotation at its outer end; and means drivingly connecting said torque member for effecting said relative rotation of said nut and shaft and including a hinging connector between said torque member and said nut.

References Cited by the Examiner
UNITED STATES PATENTS

| | | | |
|---|---|---|---|
| 2,588,188 | 3/52 | Weisman | 138—89 |
| 2,867,243 | 1/59 | Bowan | 138—89 |
| 2,870,794 | 1/59 | Thaxton | 138—90 |
| 2,993,616 | 7/61 | Carlile et al. | 138—89 XR |

LEWIS J. LENNY, *Primary Examiner.*

EDWARD V. BENHAM, *Examiner.*